US012065783B2

(12) United States Patent
Chen et al.

(10) Patent No.: US 12,065,783 B2
(45) Date of Patent: Aug. 20, 2024

(54) TRANSFER DEVICE APPLIED TO ROBOTIC ARM AND PRODUCTION LINE FOR PULP MOLDING

(71) Applicant: Shurcon Manufacturing, Inc., Lake Barrington, IL (US)

(72) Inventors: Shu Chen, Zhejiang (CN); Gang Cen, Zhejiang (CN); Weimin Chen, Zhejiang (CN)

(\*) Notice: Subject to any disclaimer, the term of this patent is extended or adjusted under 35 U.S.C. 154(b) by 0 days.

(21) Appl. No.: 16/709,317

(22) Filed: Dec. 10, 2019

(65) Prior Publication Data

US 2020/0248406 A1  Aug. 6, 2020

(30) Foreign Application Priority Data

Jan. 31, 2019 (CN) .......................... 201910098115.1

(51) Int. Cl.
*D21F 2/00* (2006.01)
*B25J 11/00* (2006.01)
(Continued)

(52) U.S. Cl.
CPC ............... *D21F 2/00* (2013.01); *B25J 11/005* (2013.01); *B25J 15/0616* (2013.01); *D21F 3/02* (2013.01); *D21F 7/00* (2013.01); *D21F 13/10* (2013.01)

(58) Field of Classification Search
CPC .... D21F 2/00; D21F 13/10; D21J 3/00; D21J 7/00; B25J 15/0633; B25J 15/06
See application file for complete search history.

(56) References Cited

U.S. PATENT DOCUMENTS 1,163,005 A 12/1915 Hall
2,879,935 A 3/1959 Carter
(Continued)

FOREIGN PATENT DOCUMENTS

CN 87206542 9/1988
CN 2035341 4/1989
(Continued)

OTHER PUBLICATIONS

U.S. Restriction Requirement, U.S. Appl. No. 15/844,556, 6 pages (dated Jul. 1, 2019).
(Continued)

*Primary Examiner* — Jacob T Minskey
*Assistant Examiner* — Matthew M Eslami
(74) *Attorney, Agent, or Firm* — BENESCH, FRIEDLANDER, COPLAN & ARONOFF LLP

(57) ABSTRACT

A transfer device applied to a robotic arm for pulp molding, which includes a wet blank transfer mold provided with a closed air chamber therein, a front surface with at least one inward concave matching cavity capable of being sleeved outside a pulp wet blank container and recessed toward the closed air chamber side, a back surface connected with a moving frame, oriented parallel to the wet blank transfer mold, through a guide mechanism, and a driver connected between the back surface of the wet blank transfer mold and the moving frame, where the driver drives the moving frame to move relative to the wet blank transfer mold and the moving frame is provided with a plurality of vacuum suction cups at uniform intervals on a side opposite from the wet pulp transfer mold. The device may transfer a wet blank and collect a molded product at the same time.

9 Claims, 10 Drawing Sheets

(51) Int. Cl.
  *B25J 15/06* (2006.01)
  *D21F 3/02* (2006.01)
  *D21F 7/00* (2006.01)
  *D21F 13/10* (2006.01)

(56) References Cited

U.S. PATENT DOCUMENTS

| | | |
|---|---|---|
| 3,065,875 A | 11/1962 | Negoro |
| 5,628,402 A | 5/1997 | Dickie et al. |
| 5,678,692 A | 10/1997 | Gratz |
| 6,082,543 A | 7/2000 | Beliveau |
| RE37,253 E | 7/2001 | Moren et al. |
| 6,405,866 B2 | 6/2002 | Arima |
| 6,576,089 B1 | 6/2003 | Sato et al. |
| 6,918,997 B2 | 7/2005 | Goto et al. |
| 8,511,473 B1 | 8/2013 | Bontrager et al. |
| 8,701,891 B2 | 4/2014 | Bontrager et al. |
| 9,138,898 B2 | 9/2015 | Liu |
| 2003/0051845 A1 | 3/2003 | Gale et al. |
| 2003/0111201 A1 | 6/2003 | Sato et al. |
| 2004/0055928 A1 | 3/2004 | Smith |
| 2004/0084166 A1 | 5/2004 | Nanomura et al. |
| 2006/0131788 A1 | 6/2006 | Takigawa |
| 2010/0294448 A1 | 11/2010 | Pierce et al. |
| 2011/0113622 A1 | 5/2011 | Liu |
| 2013/0134069 A1 | 5/2013 | Babey et al. |
| 2015/0292154 A1* | 10/2015 | Zheng .................. D21F 9/04 162/226 |
| 2018/0086511 A1 | 3/2018 | Lin |
| 2019/0010663 A1 | 1/2019 | Chen et al. |

FOREIGN PATENT DOCUMENTS

| | | |
|---|---|---|
| CN | 2055127 | 3/1990 |
| CN | 2138642 | 7/1993 |
| CN | 2439458 Y | 7/2001 |
| CN | 1423719 | 6/2003 |
| CN | 2832697 Y | 11/2006 |
| CN | 101288890 A | 9/2008 |
| CN | 102465477 A | 5/2012 |
| CN | 102733268 A | 10/2012 |
| CN | 202595578 U | 12/2012 |
| CN | 101961921 B | 3/2013 |
| CN | 203030868 U | 7/2013 |
| CN | 102059706 B | 8/2013 |
| CN | 203622422 U | 6/2014 |
| CN | 203668762 U | 6/2014 |
| CN | 204263176 U | 4/2015 |
| CN | 204264636 | 4/2015 |
| CN | 105253621 A | 1/2016 |
| CN | 205387641 U | 7/2016 |
| CN | 106436489 A | 2/2017 |
| CN | 206142441 U | 5/2017 |
| CN | 107059491 A | 8/2017 |
| CN | 107195954 A | 9/2017 |
| CN | 206590564 U | 10/2017 |
| CN | 107813545 A | 3/2018 |
| CN | 107815930 | 3/2018 |
| CN | 107915044 A | 4/2018 |
| CN | 207259870 U | 4/2018 |
| CN | 207404482 U | 5/2018 |
| CN | 108130824 A | 6/2018 |
| CN | 108396595 A | 8/2018 |
| CN | 108457132 A | 8/2018 |
| CN | 108589432 A | 9/2018 |
| CN | 208072083 U | * 11/2018 |
| CN | 208072083 U | 11/2018 |
| CN | 208121482 U | 11/2018 |
| CN | 208658569 U | 3/2019 |
| CN | 110216710 A | 9/2019 |
| CN | 110219210 A | 9/2019 |
| CN | 209599250 U | 11/2019 |
| CN | 209619753 U | 11/2019 |
| EP | 0798225 | 10/1997 |
| EP | 1 074 657 | 2/2001 |
| EP | 1074657 A1 | 2/2001 |
| EP | 1 285 994 | 2/2003 |
| EP | 1285994 A1 | 2/2003 |
| JP | 2001254300 A | 9/2001 |
| JP | 2001303498 A | 10/2001 |
| JP | 2007039093 A | 2/2007 |
| TW | M538917 U | 4/2017 |
| TW | 610007 | 1/2018 |
| WO | 03/014471 | 2/2003 |
| WO | 2010/124300 | 10/2010 |
| WO | 2018/216544 A1 | 11/2018 |
| WO | 2019/141117 | 7/2019 |

OTHER PUBLICATIONS

U.S. Non-Final Office Action; U.S. Appl. No. 15/844,556, 9 pages (dated Sep. 19, 2019).
U.S. Final Office Action; U.S. Appl. No. 15/844,556, 6 pages (dated Feb. 12, 2020).
U.S. Notice of Allowance, U.S. Appl. No. 13/559,132, 7 pages (dated Jun. 27, 2013).
U.S. Notice of Allowance, U.S. Appl. No. 13/970,232, 8 pages (dated Dec. 4, 2013).
PCT, International Search Report with English translation, and Written Opinion, PCT Patent Application No. PCT/CN2019/070942, 11 pages (dated Apr. 8, 2019).
China National Intellectual Property Administration (ISA/CN), International Search Report (with English translation), International Application No. PCT/CN2019/128103, 8 pages, dated Mar. 19, 2020.
China National Intellectual Property Administration (ISA/CN), Written Opinion of the International Searching Authority (with English translation), International Application No. PCT/CN2019/128103, 8 pages, dated Mar. 19, 2020.
China National Intellectual Property Administration (ISA/CN), International Search Report (with English translation), International Application No. PCT/CN2019/128104, 6 pages, dated Mar. 18, 2020.
China National Intellectual Property Administration (ISA/CN), Written Opinion of the International Searching Authority (with English translation), International Application No. PCT/CN2019/128104, 9 pages, dated Mar. 18, 2020.
U.S. Patent and Trademark Office, Non-Final Office Action, U.S. Appl. No. 16/709,039, 25 pages, dated Feb. 18, 2021.
U.S. Patent and Trademark Office, Notice of Allowance, U.S. Appl. No. 16/709,039, 14 pages, dated Oct. 27, 2021.
First Opinion in CN Application No. CN201910098112.8, dated Apr. 28, 2023 (10 pgs.).
First Opinion in CN Application No. CN201910098115.1, dated Dec. 21, 2023 (6 pgs.).

* cited by examiner

TRANSFER DEVICE APPLIED TO ROBOTIC ARM AND PRODUCTION LINE FOR PULP MOLDING

CROSS-REFERENCE TO RELATED APPLICATIONS

This application claims priority to Chinese Patent Application No. 201910098115.1, filed on Jan. 31, 2019 and titled "Transfer Device Applied to Robotic Arm and Production Line for Pulp Molding," which is incorporated herein by reference in its entirety.

TECHNICAL FIELD

The present invention belongs to the technical field of pulp molding machinery, and in particular relates to a transfer device applied to a robotic arm and a production line for pulp molding.

BACKGROUND

For molded pulp products, cold extrusion and thermoforming are required during the production and processing, and a robotic arm is used for transportation between the cold extrusion and the thermoforming.

An existing robotic arm for pulp molding production is generally equipped with a transfer mold jig, which is used for transferring a molded pulp wet blank to a mold or for taking or releasing a press-formed product. That is, only one action can be performed at a time, and the transfer of the wet blank and the taking and releasing of the product cannot be completed at the same time, resulting in lower production efficiency.

For this purpose, for example, Chinese Patent Application No. 201320735610.7 discloses a conveying robotic arm for a pulp molding machine. This robotic arm has three degrees of freedom and can move in three directions: X, Y, and Z. The X-direction movement (side movement) is achieved by two rodless cylinders and linear guide rails and can accurately realize positioning of three states. The Y-direction movement (translational movement) and the Z-direction movement (vertical rise and fall) are achieved by a motor and a screw rod and can realize accurate positioning at any position within the stroke range. The grab and release of a steel tray is achieved by energizing and deenergizing of an electromagnet. By using the robotic arm, goods produced by the pulp molding machine can be directly received by the trays from the mold, then sequentially placed onto a trolley, and uniformly dried. The robotic arm has the characteristics of simple structure, easy manufacture, low cost and stable performance, can replace manual work, and saves labor and production cost.

Although the above solution has many advantages as described above, it does not solve the above technical problems.

SUMMARY

An objective of the present invention is to provide a transfer device applied to a robotic arm for pulp molding and a production line thereof which can greatly improve production efficiency in view of the above problems.

In order to achieve the above objective, the present invention adopts the following technical solutions:

A transfer device applied to a robotic arm for pulp molding includes a wet blank transfer mold provided with a closed air chamber therein, a front surface of the wet blank transfer mold is provided with at least one inward concave matching cavity capable of being sleeved outside a pulp wet blank container and recessed toward the closed air chamber side, the inward concave matching cavity is matched with the pulp wet blank container, an inner wall of each inward concave matching cavity and a bottom of the inward concave matching cavity are respectively provided with a plurality of small communicating holes for communicating the inward concave matching cavity with and the closed air chamber, the communicating small holes disposed in the inner wall of the inward concave matching cavity are uniformly distributed circumferentially and form at least one circle, the small communicating holes disposed in the bottom of the inward concave matching cavity are uniformly distributed circumferentially and form at least one circle, a back surface of the wet blank transfer mold is connected with a moving frame parallel to the wet blank transfer mold through a guide mechanism, a driver is connected between the back surface of the wet blank transfer mold and the moving frame and the driver drives the moving frame to move relative to the wet blank transfer mold, the moving frame is provided with a plurality of vacuum suction cups at uniform intervals, and the vacuum suction cups and the closed air chamber are respectively connected to a vacuumizing system.

Preferably, the bottom of the inward concave matching cavity is provided with two circles and each circle is formed by a plurality of small communicating holes uniformly distributed circumferentially.

Preferably, a center of the bottom of the inward concave matching cavity is provided with a central small hole for communicating the inward concave matching cavity with the closed air chamber.

Preferably, the wet blank transfer mold includes a main mold plate provided with a chamber at a back surface, the chamber has an opening communicating with the outside, a front surface of the main mold plate is provided with a plurality of inward concave matching cavities distributed in an array, an inner wall of each inward concave matching cavity and a bottom of the inward concave matching cavity are respectively provided with a plurality of small communicating holes for communicating the inward concave matching cavity with the closed air chamber, an inner bottom of the chamber is provided with a plurality of inward convex portions corresponding to the inward concave matching cavities one to one, the small communicating hole extends through the inward convex portion, the wet blank transfer mold further includes a closing mold plate for closing the opening of the chamber, and the closed air chamber is formed between the main mold plate and the closing mold plate.

Preferably, a bottom of the chamber is provided with a reinforcing support structure in contact with a surface of the closing mold plate adjacent to the chamber.

Preferably, the reinforcing support structure includes a plurality of lateral reinforcing support protrusions I at uniform intervals and a plurality of longitudinal reinforcing support protrusions II at uniform intervals, the reinforcing support protrusions I are located on the same straight line and located at lateral center positions of the chamber, the reinforcing support protrusions II are located on the same straight line and located at longitudinal center positions of the chamber, the reinforcing support protrusion I and the reinforcing support protrusion II form a cross, one end of the reinforcing support protrusion I away from the bottom of the chamber abuts against a surface of the closing mold plate adjacent to the chamber, and one end of the reinforcing support protrusion II away from the bottom of the chamber abuts against a surface of the closing mold plate adjacent to the chamber.

Preferably, one end of each reinforcing support protrusion I abutting against the closing mold plate is provided with a supporting plane I, one end of each reinforcing support protrusion II abutting against the closing mold plate is provided with a supporting plane II, and the supporting plane I and the supporting plane II are located in the same plane.

Preferably, an inner wall of the chamber is provided with a plurality of curved concave surfaces connected in sequence, and the outmost inward convex portions in the inward convex portions correspond to the curved concave surfaces one to one.

Preferably, the guide mechanism includes a plurality of guide posts which are parallel to each other and each have one end fixed to the back surface of the wet blank transfer mold, the moving frame is provided with a plurality of guide sleeve fixing holes and guide sleeves fixed to the guide sleeve fixing holes, and the guide sleeves are sleeved on the guide posts one to one and the guide sleeve and the guide post are slidably connected.

Preferably, every six inward concave matching cavities form one region and the front surface of the wet blank transfer mold is provided with four of the regions.

Preferably, every two adjacent reinforcing support protrusions I are connected through a curved connecting rib I, there are two reinforcing support protrusions II located on the outer side of the middlemost reinforcing support protrusion I, and each reinforcing support protrusion II and the middlemost reinforcing support protrusion I are connected through a curved connecting rib II.

Preferably, the main mold plate and the closing mold plate are connected through a detachable connection structure.

Preferably, the detachable connection structure includes an annular shoulder disposed in a circumferential direction of the main mold plate, a thickness of the annular shoulder is less than a thickness of the main mold plate, a back surface of the main mold plate is flush with a back surface of the annular shoulder, a locking bolt runs through each side edge of the closing mold plate, the locking bolt extends through a nail hole of the annular shoulder and a locking nut is sleeved on the locking bolt, and the locking nut is in contact with a front surface of the annular shoulder.

Preferably, the front surface of the annular shoulder is provided with a reserved notch communicating with the nail hole, and the locking nut is located in the reserved notch and is in contact with a bottom surface of the reserved notch.

A production line for pulp molding includes a robotic arm for pulp molding and at least one press. The robotic arm for pulp molding is connected with a transfer device, the press is provided with an auxiliary frame located between a movable lower mold holder and an upper mold holder, the press is provided with a lifting drive mechanism for driving the auxiliary frame to rise and fall in a vertical direction, the robotic arm for pulp molding forces the transfer device to extend between the movable lower mold holder and the upper mold holder, and the lifting drive mechanism drives the auxiliary frame to contact the transfer device and forces the transfer device to vertically move upward and downward.

Compared with the prior art, the present invention has the following advantages:

1. Compared with the prior art, the transfer of the wet blank and the taking of the product can be carried out at the same time. Without moving the robotic arm, the suction cup extends onto the product mold through a direct acting device, and takes out the product, thereby achieving the objective of transferring the wet blank and the product at the same time, and greatly improving the production efficiency.

2. The transfer device has the advantages of simple structure and low manufacturing cost.

3. The production line greatly improves the production efficiency.

Figure 1:
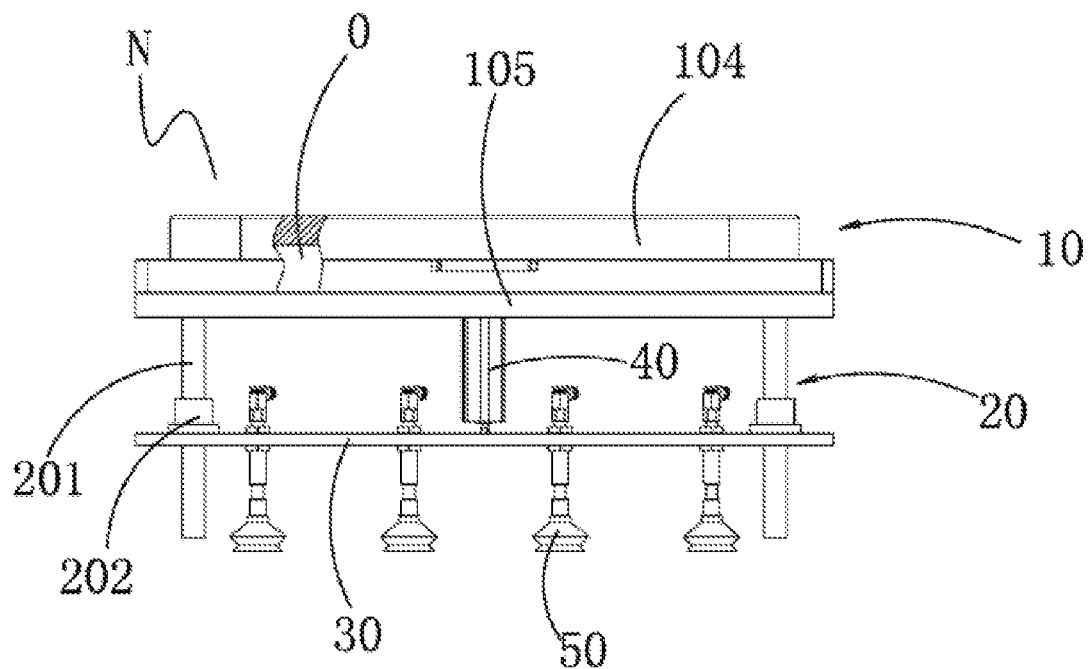
FIG. 1 is a structural schematic view of a transfer device provided by the present invention.

The figures include, closed air chamber 0, wet blank transfer mold 10, inward concave matching cavity 101, small communicating hole 102, central small hole 103, main mold plate 104, chamber 1041, inward convex portion 1042, reinforcing support protrusion I 1043, reinforcing support protrusion II 1044, supporting plane I 1045, supporting plane II 1046, curved concave surface 1047, curved connecting rib I 1048, curved connecting rib II 1049, closing mold plate 105, annular shoulder 106, reserved notch 107, guide mechanism 20, guide post 201, guide sleeve 202, moving frame 30, driver 40, vacuum suction cup 50, vacuumizing system 60, robotic arm for pulp molding 3a, press 2a, transfer device Q, auxiliary frame N, auxiliary push plate 1, polygonal central through hole 11, circular chamfer I 111, circular chamfer II 112, cantilever boss 12, guide circular hole 121, reinforcing structure 13, lateral reinforcing rib 131, longitudinal reinforcing rib 132, lower base 2, vertical guide post 21, upper mold holder 3, movable lower mold holder 4, press master cylinder 41, lifting drive mechanism 5, fixed frame body 51, elongated hole I 511, elongated hole II 512, fixed plate 513, bolt I 514, air cylinder I 52.

DETAILED DESCRIPTION

The technical solutions of the present invention will be further described below by way of specific embodiments and in conjunction with the accompanying drawings, but the present invention is not limited to these embodiments.

As shown in FIGS. 1 to 4:

A transfer device applied to a robotic arm for pulp molding includes a wet blank transfer mold 10 provided with a closed air chamber 0 therein, a front surface of the wet blank transfer mold 10 is provided with at least one inward concave matching cavity 101 capable of being sleeved outside a pulp wet blank container and recessed toward the closed air chamber 0 side, and the inward concave matching cavity 101 is matched with the pulp wet blank container. This structure can enlarge the contact surface with the pulp wet blank container and can improve the material taking efficiency and stability.

An inner wall of each inward concave matching cavity 101 and a bottom of the inward concave matching cavity 101 are respectively provided with a plurality of small communicating holes 102 for communicating the inward concave matching cavity 101 with the closed air chamber 0, the small communicating holes 102 disposed in the inner wall of the inward concave matching cavity 101 are uniformly distributed circumferentially and form at least one circle, and the small communicating holes 102 disposed in the bottom of the inward concave matching cavity 101 are uniformly distributed circumferentially and form at least one circle. By designing at least one circle of the small communicating holes 102 in different positions, the material taking stability can be ensured.

In a preferred solution, the bottom of the inward concave matching cavity 101 of the present embodiment is provided with two circles and each circle is formed by a plurality of small communicating holes 102 uniformly distributed circumferentially.

Secondly, a center of the bottom of the inward concave matching cavity 101 is provided with a central small hole 103 for communicating the inward concave matching cavity 101 with the closed air chamber 0.

A back surface of the wet blank transfer mold 10 is connected with a moving frame 30 parallel to the wet blank transfer mold 10 through a guide mechanism 20. The guide mechanism 20 here includes a plurality of guide posts 201 which are parallel to each other and each have one end fixed to the back surface of the wet blank transfer mold 10, the moving frame 30 is provided with a plurality of guide sleeve fixing holes and guide sleeves 202 fixed to the guide sleeve fixing holes, and the guide sleeves 202 are sleeved on the guide posts 201 one to one and the guide sleeve 202 and the guide post 201 are slidably connected.

The synergistic cooperation of the guide sleeve 202 and the guide post 201 can further improve the smoothness and stability of the rise and fall.

A driver 40 is connected between the back surface of the wet blank transfer mold 10 and the moving frame 30 and the driver 40 drives the moving frame 30 to move relative to the wet blank transfer mold 10, and the driver 40 is any one of an air cylinder, a hydrocylinder and a linear motor.

The moving frame 30 is provided with a plurality of vacuum suction cups 50 at uniform intervals, and the vacuum suction cups 50 and the closed air chamber 0 are respectively connected to a vacuumizing system 60. The vacuumizing system 60 includes a vacuum line and a vacuumizing device connected to the vacuum line, and the vacuumizing device is a commercially available product.

That is, the vacuumizing device forces the closed air chamber 0 to be evacuated during vacuumizing, and at this time, the small communicating holes 102 and the central small hole 103 can be utilized to suck the pulp wet blank container and transfer it into a forming mold, that is, into an upper mold or a lower mold of the forming mold. At the same time, the vacuum suction cup 50 rises or falls under the action of the driver so as to suck the formed molded pulp product. The actions of transferring and taking and releasing can be completed at the same time, thereby greatly improving the production and processing efficiency.

At the time of release, the vacuum is changed to air blowing.

Specifically, the wet blank transfer mold 10 includes a main mold plate 104 provided with a chamber 1041 at a back surface, the chamber 1041 has an opening communicating with the outside, a front surface of the main mold plate 104 is provided with a plurality of inward concave matching cavities 101 distributed in an array, an inner wall of each inward concave matching cavity 101 and a bottom of the inward concave matching cavity 101 are respectively provided with a plurality of small communicating holes 102 for communicating the inward concave matching cavity 101 with the closed air chamber 0, an inner bottom of the chamber 1041 is provided with a plurality of inward convex portions 1042 corresponding to the inward concave matching cavities 101 one to one, the small communicating hole 102 extends through the inward convex portion 1042, the wet blank transfer mold 10 further includes a closing mold plate 105 for closing the opening of the chamber 1041, and the closed air chamber 0 is formed between the main mold plate 104 and the closing mold plate 105.

The inward convex portion 1042 corresponds to the inward concave matching cavity 101, thereby facilitating the development of the mold and lowering the manufacturing difficulty.

The wet blank is not limited to the upper mold, and the product is not limited to the lower mold. That is, the wet blank can be transferred to the upper mold or transferred to the lower mold, and the corresponding product is taken out from the lower mold or the upper mold. This objective can be achieved using the same device by normally mounting or reversely mounting the device or by overturning with a joint at the end of the robotic arm.

The wet blank transfer or product transfer is achieved by vacuum suction. The wet blank mold has the closed air chamber therein and the air chamber is connected to the vacuum line, and the suction cup is connected to the vacuum line. The wet blank or the product is released, and the vacuum is changed to air blowing.

Figure 2:
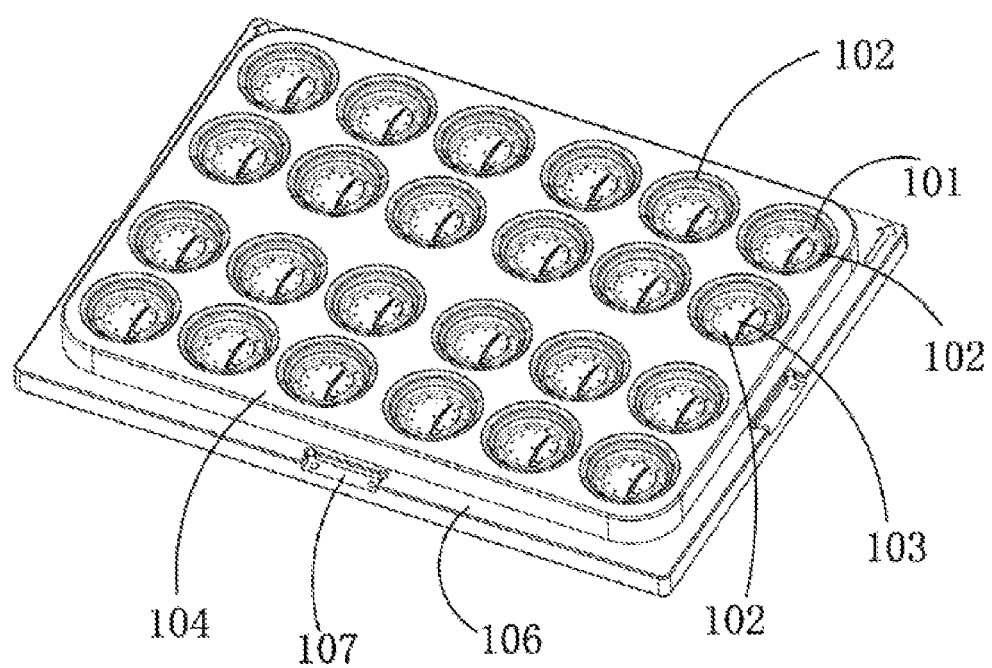
FIG. 2 is a structural schematic view of a front surface of a main mold plate of the transfer device provided by the present invention.
Figure 3:
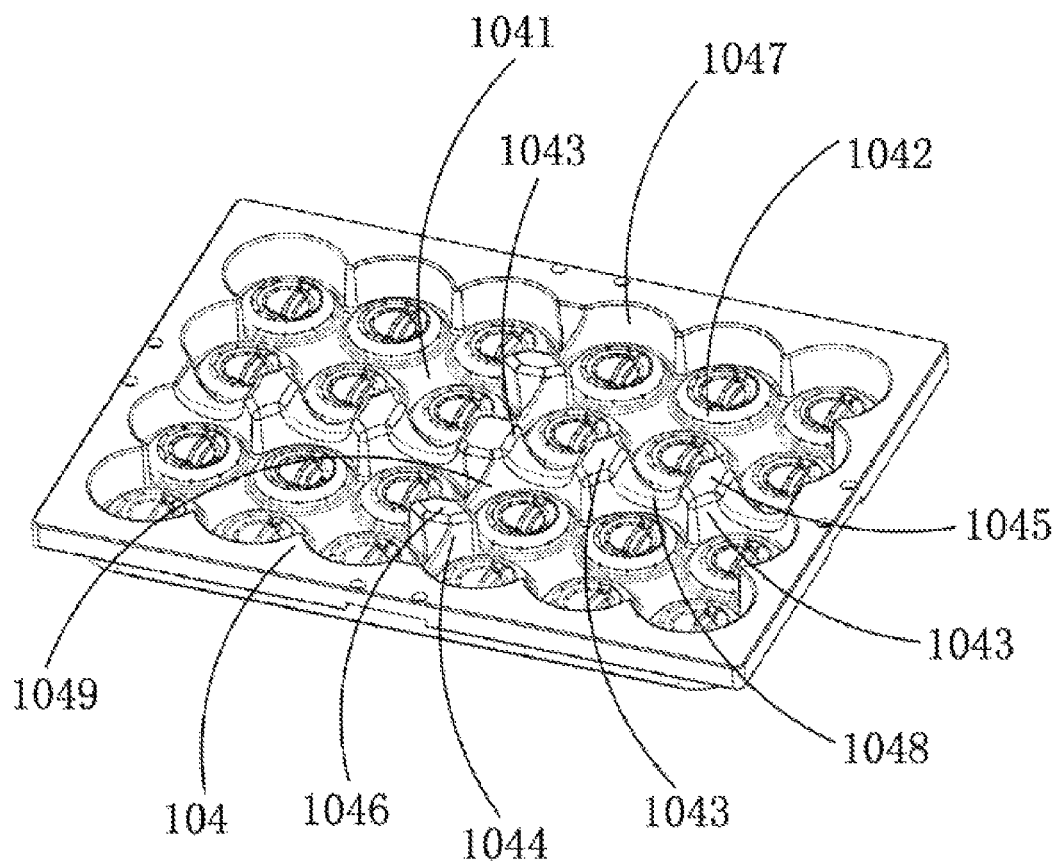
FIG. 3 is a structural schematic view of a back surface of the main mold plate of the transfer device provided by the present invention.
Figure 4:
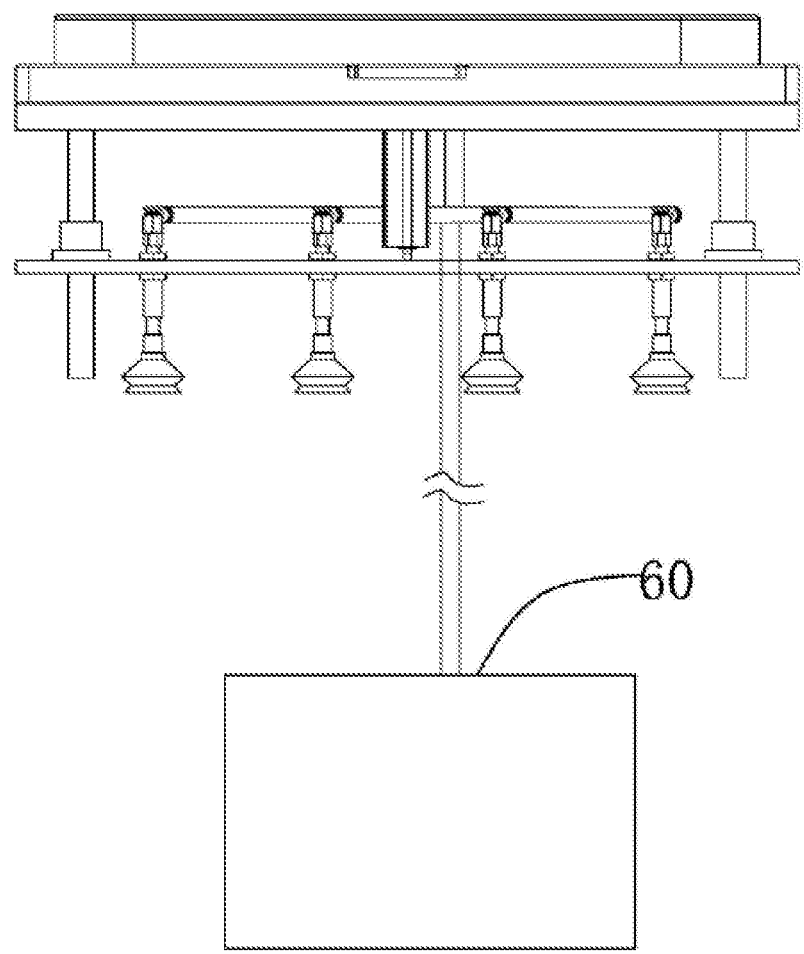
FIG. 4 is a structural schematic view of the transfer device provided by the present invention connected to a vacuumizing system.
Figure 5:
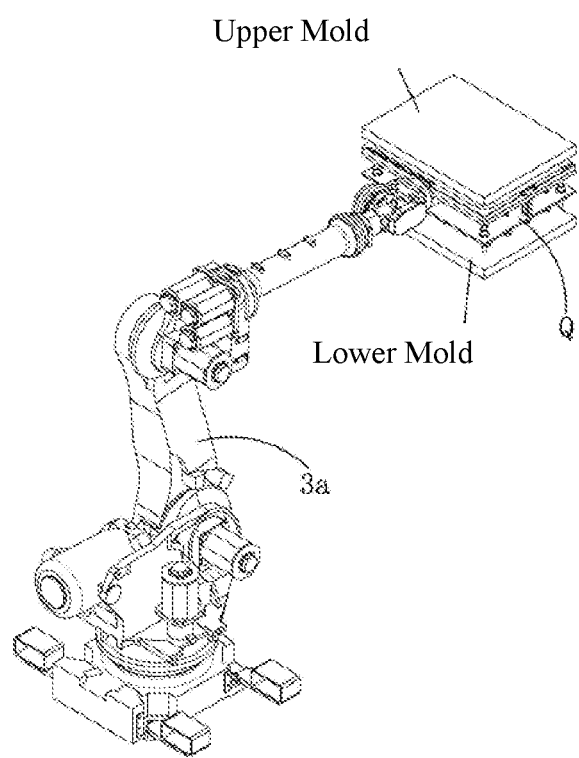
FIG. 5 is a structural schematic view of the transfer device provided by the present invention after being mounted to a robotic arm.
Figure 6:
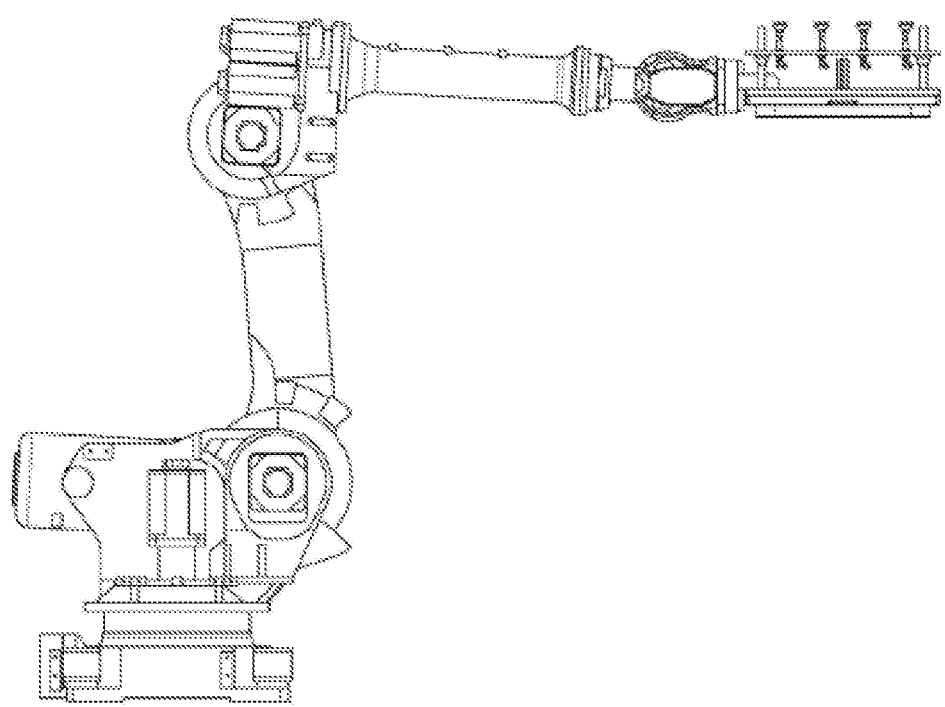
FIG. 6 is a structural schematic view of the transfer device provided by the present invention in a first state.
Figure 7:
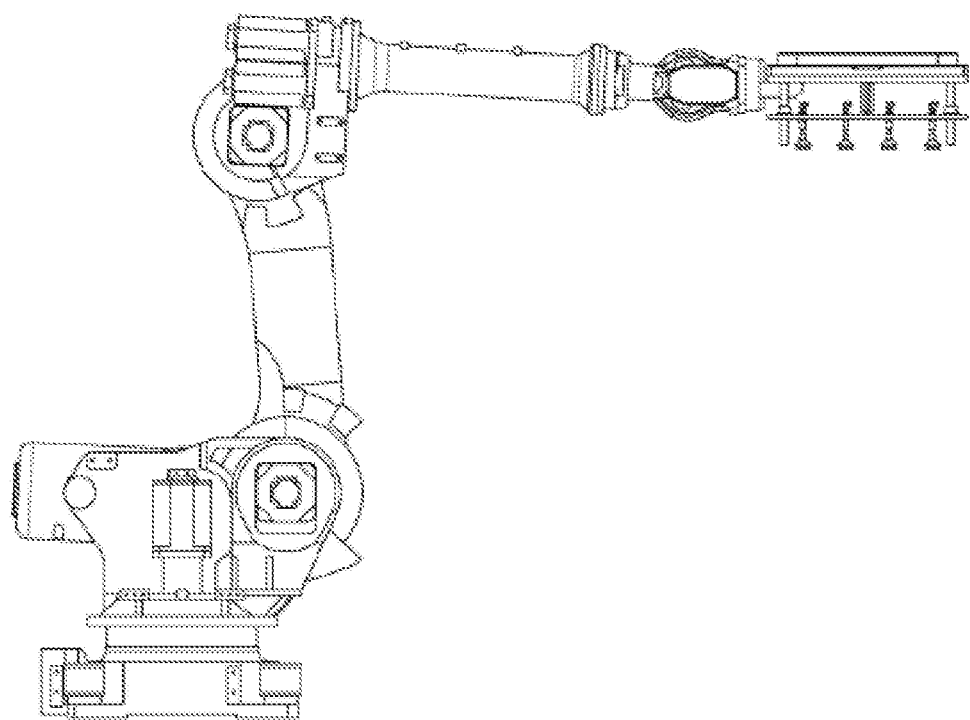
FIG. 7 is a structural schematic view of the transfer device provided by the present invention in a second state.
Figure 8:
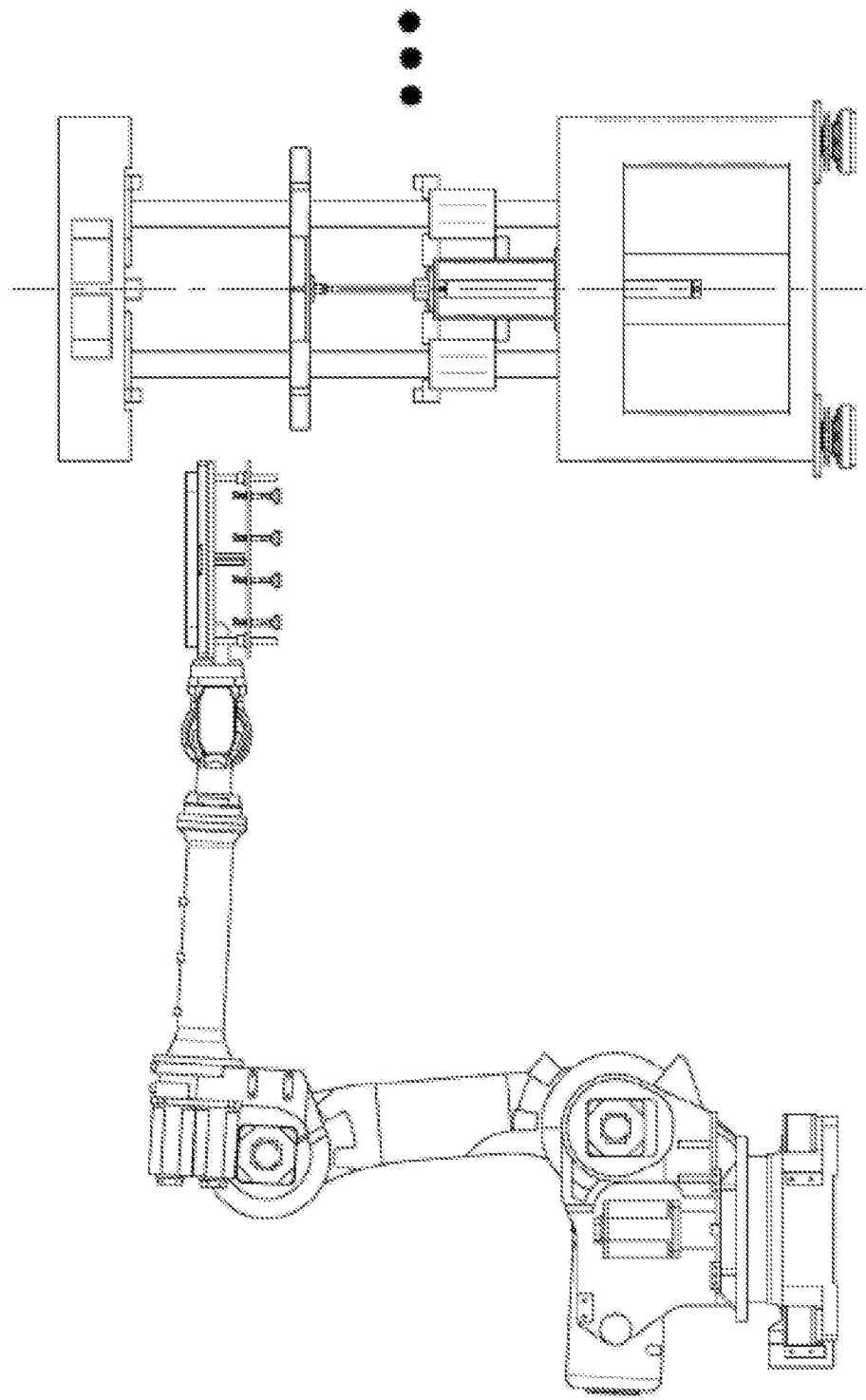
FIG. 8 is a structural schematic view of a production line provided by the present invention.
Figure 9:
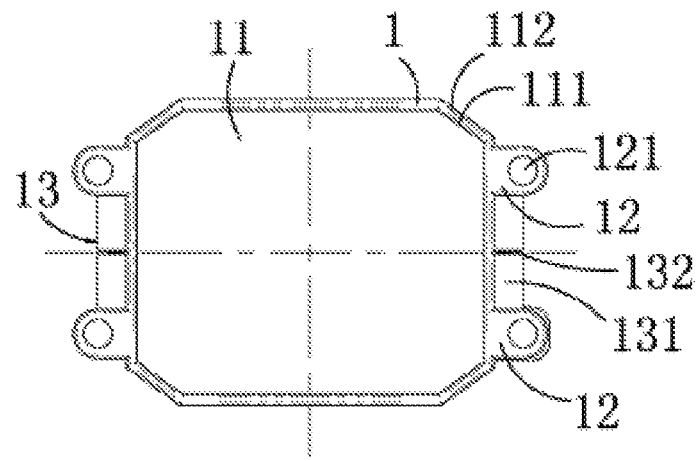
FIG. 9 is a structural schematic view of an auxiliary frame provided by the present invention.
Figure 10:
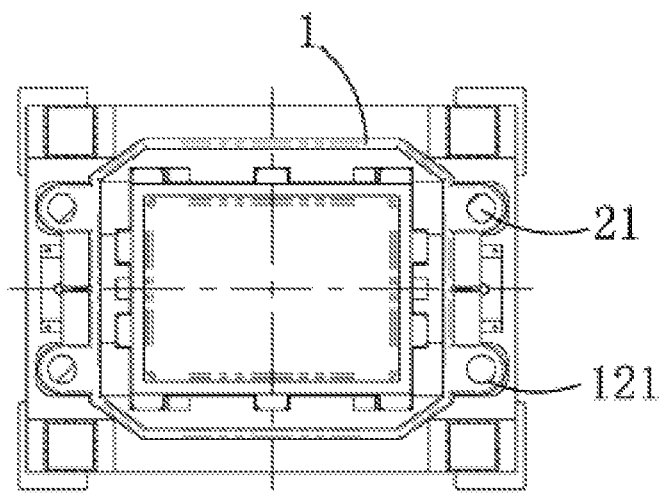
FIG. 10 is a structural schematic view of the auxiliary frame provided by the present invention mounted on a press.
Figure 11:
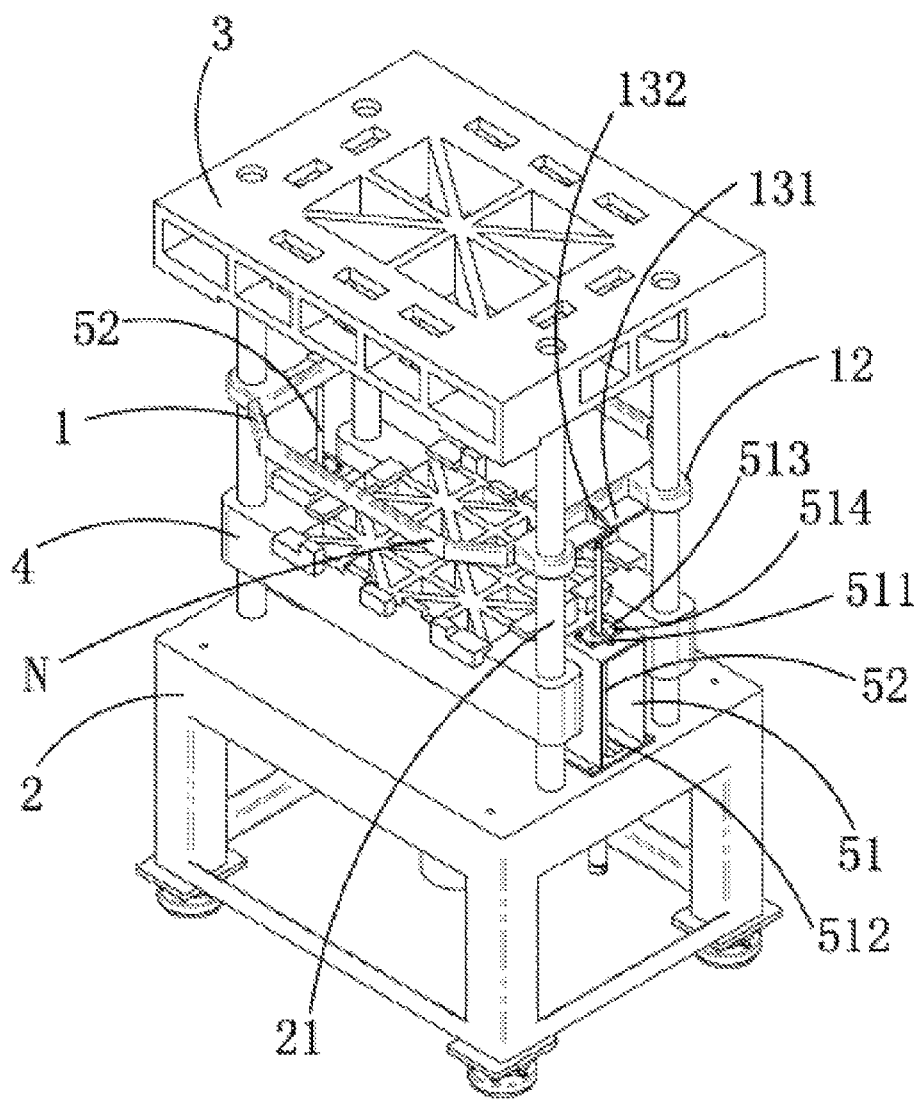
FIG. 11 is a three-dimensional structural schematic view of the press provided by the present invention.
Figure 12:
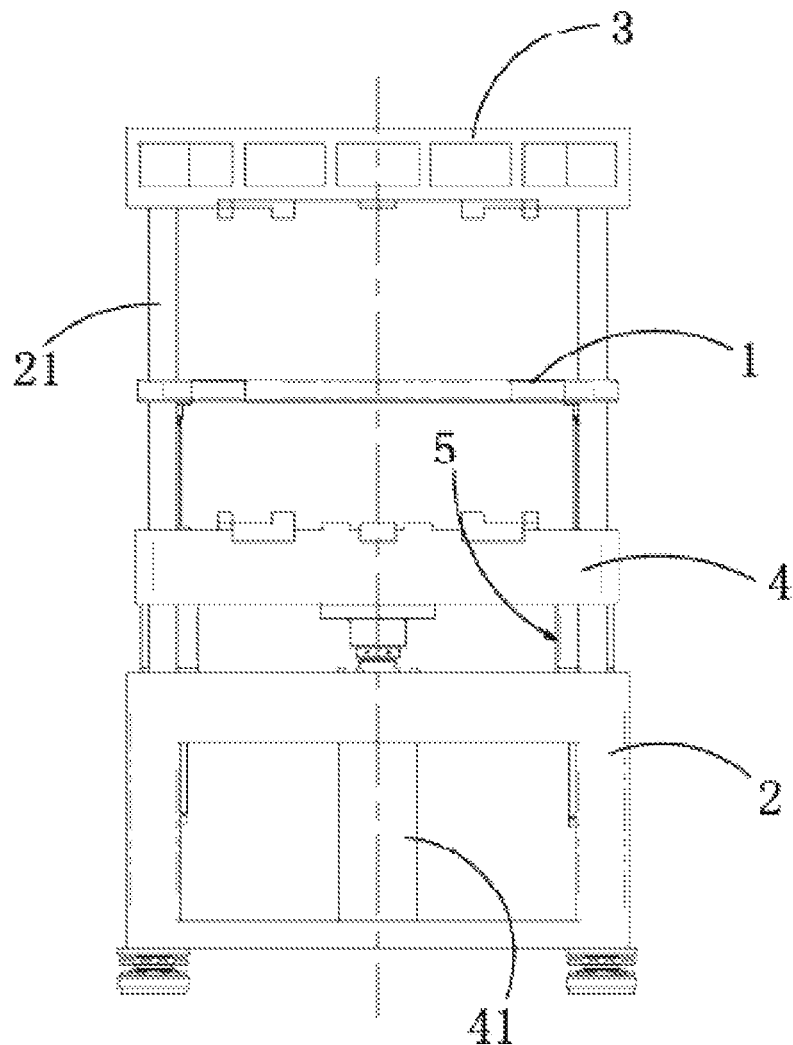
FIG. 12 is a structural schematic view of the press provided by the present invention.

As shown in FIGS. 2 to 3, a bottom of the chamber 1041 is provided with a reinforcing support structure in contact with a surface of the closing mold plate 105 adjacent to the chamber 1041. Specifically, the reinforcing support structure of the present embodiment includes a plurality of lateral reinforcing support protrusions I 1043 at uniform intervals and a plurality of longitudinal reinforcing support protrusions II 1044 at uniform intervals, the reinforcing support protrusions I 1043 are located on the same straight line and located at lateral center positions of the chamber 1041, the reinforcing support protrusions II 1044 are located on the same straight line and located at longitudinal center positions of the chamber 1041, the reinforcing support protrusion I 1043 and the reinforcing support protrusion II 1044 form a cross, one end of the reinforcing support protrusion I 1043 away from the bottom of the chamber 1041 abuts against a surface of the closing mold plate 105 adjacent to the chamber 1041, and one end of the reinforcing support protrusion II 1044 away from the bottom of the chamber 1041 abuts against a surface of the closing mold plate 105 adjacent to the chamber 1041.

The reinforcing support protrusions I 1043 and the reinforcing support protrusions II 1044 can further enhance the structural strength and prolong the service life of the closing mold plate 105.

One end of each reinforcing support protrusion I 1043 abutting against the closing mold plate 105 is provided with a supporting plane I 1045, one end of each reinforcing support protrusion II 1044 abutting against the closing mold plate 105 is provided with a supporting plane II 1046, and the supporting plane I 1045 and the supporting plane II 1046 are located in the same plane.

The supporting planes can improve the contact stability and reliability.

An inner wall of the chamber 1041 is provided with a plurality of curved concave surfaces 1047 connected in sequence, and the outmost inward convex portions 1042 in the inward convex portions 1042 correspond to the curved concave surfaces 1047 one to one.

In addition, every six inward concave matching cavities 101 of the present embodiment form one region and the front surface of the wet blank transfer mold 10 is provided with four of the regions.

Secondly, every two adjacent reinforcing support protrusions I 1043 are connected through a curved connecting rib I 1048, there are two reinforcing support protrusions II 1044 located on the outer side of the middlemost reinforcing support protrusion I 1043, and each reinforcing support protrusion II 1044 and the middlemost reinforcing support protrusion I 1043 are connected through a curved connecting rib II 1049.

In addition, in order to facilitate mounting, demounting and connection, the main mold plate 104 and the closing mold plate 105 of the present embodiment are connected through a detachable connection structure. Specifically, the detachable connection structure includes an annular shoulder 106 disposed in a circumferential direction of the main mold plate 104, a thickness of the annular shoulder is less than a thickness of the main mold plate 104, a back surface of the main mold plate 104 is flush with a back surface of the annular shoulder, a locking bolt runs through each side edge of the closing mold plate 105, the locking bolt extends through a nail hole of the annular shoulder and a locking nut is sleeved on the locking bolt, and the locking nut is in contact with a front surface of the annular shoulder.

The front surface of the annular shoulder is provided with a reserved notch 107 communicating with the nail hole, and the locking nut is located in the reserved notch and is in contact with a bottom surface of the reserved notch.

As shown in FIGS. 1 to 12:

A production line for pulp molding includes a robotic arm for pulp molding 3a and at least one press 2a. The press includes a lower base 2 and four vertical guide posts 21 connected to a top of the lower base 2, and an upper mold holder 3 connected to upper ends of the four vertical guide posts 21, and further includes a movable lower mold holder 4 that is located directly below the upper mold holder 3 and movably connected to the vertical guide posts 21. The movable lower mold holder 4 is connected to a press master cylinder 41, and the press master cylinder 41 drives the movable lower mold holder 4 to rise and fall along an axial direction of the vertical guide post 21. The press master cylinder 41 is fixed to a center of the lower base 2, and at the same time, a telescopic rod of the press master cylinder 41 is connected upwardly to a center of a lower surface of the movable lower mold holder 4.

During production, the press master cylinder 41 drives the movable lower mold holder 4 to rise and fall, and cooperates with the vertical guide posts 21, which can improve the stability and reliability of the rise and fall.

The robotic arm for pulp molding 3a is connected with a transfer device Q, the transfer device Q is the above-mentioned "transfer device applied to a robotic arm for pulp molding", the press 2a is provided with an auxiliary frame N located between the movable lower mold holder 4 and the upper mold holder 3, the press is provided with a lifting drive mechanism 5 for driving the auxiliary frame to rise and fall in a vertical direction, the robotic arm for pulp molding forces the transfer device to extend between the movable lower mold holder and the upper mold holder, and the lifting drive mechanism drives the auxiliary frame to contact the transfer device and forces the transfer device to vertically move upward and downward.

The auxiliary frame N includes an auxiliary push plate 1 disposed horizontally, the auxiliary push plate 1 is made of a metal material or a non-metal material, and any material that can satisfy the strength requirement can be adopted by the present embodiment.

The auxiliary push plate 1 is provided with a polygonal central through hole 11, and in a preferred solution, the polygonal central through hole 11 of the present embodiment is an octagonal through hole. A mold jig can be placed in the octagonal central through hole which is in contact with the mold jig, so that the mold jig is forced to rise and fall under the action of the lifting drive mechanism.

Secondly, a periphery of the auxiliary push plate 1 is provided with outer side edges corresponding to walls of the octagonal through hole one to one, and the outer side edges form an octagon.

Secondly, an upper orifice and a lower orifice of the octagonal through hole are respectively provided with a circular chamfer I 111, and two sides of each outer side edge are respectively provided with a circular chamfer II 112.

The circular chamfers can avoid crushing the mold jig or the pulp product.

Each of two end portions of the auxiliary push plate 1 are respectively provided with two cantilever bosses 12, each cantilever boss 12 is respectively provided with a vertically disposed guide circular hole 121, and a reinforcing structure 13 is disposed between the two cantilever bosses 12 at the same end portion.

Specifically, the reinforcing structure 13 includes a lateral reinforcing rib 131 connected between the two cantilever bosses 12 and the lateral reinforcing rib 131 is connected to an outer wall of the auxiliary push plate 1, and a middle of the lateral reinforcing rib 131 is provided with a longitudinal reinforcing rib 132 and an inner end of the longitudinal reinforcing rib 132 is connected to the outer wall of the auxiliary push plate 1.

The auxiliary push plate 1, the cantilever bosses 12, the lateral reinforcing rib 131 and the longitudinal reinforcing rib 132 are integrally formed, which can enhance the overall structural strength.

The lifting drive mechanism 5 drives the auxiliary push plate 1 to rise and fall between the movable lower mold holder 4 and the upper mold holder 3. At this time, under the action of the auxiliary push plate 1, the mold jig connected to the robotic arm can be forced to move upward or downward, and the robotic arm does not need to perform the upward or downward push action, so that the working reliability of the robotic arm can be ensured. At the same time, the service life of the robotic arm is prolonged, so that the production can be performed continuously and steadily, which is more in line with the production requirements of the enterprise.

The lifting drive mechanism 5 includes two fixed frame bodies 51 respectively fixed to the top of the lower base 2, an air cylinder I 52 is respectively fixed in each of the fixed frame bodies 51, and a telescopic rod of the air cylinder I 52 is connected upwardly to a middle of a lower surface of the lateral reinforcing rib 131.

The fixed frame body 51 includes a rectangular framework and is vertically fixed. A central region of an upper end of the fixed frame body 51 is provided with an elongated hole I 511, and a central region of a lower end of the fixed frame body 51 is provided with an elongated hole II 512. The telescopic rod of the air cylinder I 52 extends through the elongated hole I 511, and an upper end of a cylinder block of the air cylinder I 52 is sleeved with a fixed plate 513. The fixed plate 513 is located on an upper surface of an orifice of the elongated hole I 511, and a plurality of bolts I 514 extend through the fixed plate 513. The bolt I 514 is in a threaded connection with a threaded hole at the top of the fixed frame body 51, and a lower end of the air cylinder I 52 extends through the elongated hole II 512.

The design of the elongated holes facilitates the movement and adjustment of the position.

When the press operates, the movable lower mold holder 4 is driven by the press master cylinder 41 to move upward at this time, and then a pulp product lower mold on the movable lower mold holder 4 and a pulp product upper mold on the upper mold holder 3 cooperate with each other to process the pulp product. After the processing is completed, since the robotic arm needs to take the pulp product at this time, a mold jig is mounted onto the robotic arm to take the pulp product and release it at the next station. During the taking and releasing, the lifting drive mechanism 5 forces the auxiliary push plate 1 to rise and fall in the vertical direction, that is, the auxiliary push plate 1 is sleeved on the mold jig to help the mold jig rise and fall, thereby solving the phenomenon of alarming caused by the robotic arm forcing the mold jig to move upward or downward.

It is claimed:

1. A transfer device for use with a robotic arm for pulp molding, the transfer device comprising:
   a wet blank transfer mold defining a closed air chamber therein,
      wherein a front surface of the wet blank transfer mold defines at least one inward concave matching cavity recessed toward a closed air chamber side, which inward concave matching cavity is configured to be sleeved outside a pulp wet blank container, the inward concave matching cavity being matched with the pulp wet blank container,
      wherein an inner wall of each inward concave matching cavity and a bottom of each inward concave matching cavity have a plurality of communicating holes defined therein that connect the inward concave matching cavity with the closed air chamber, the communicating holes disposed in the inner wall of each inward concave matching cavity being uniformly distributed circumferentially to form at least one circle, and the communicating holes disposed in the bottom of each inward concave matching cavity being uniformly distributed circumferentially to form at least one circle;
   a moving frame connected to a back surface of the wet blank transfer mold via a guide mechanism, the moving frame oriented parallel to the wet blank transfer mold;
   a driver connected between the back surface of the wet blank transfer mold and the moving frame and configured to drive movement of the moving frame relative to the wet blank transfer mold; and
   a plurality of vacuum suction cups disposed on the moving frame at uniform intervals on a side of the moving frame opposite the wet pulp transfer mold, the vacuum suction cups and the moving frame configured to be moved by the driver so as to rise or fall with respect to the back surface of the wet blanket transfer mold, the vacuum suction cups and the closed air chamber configured to be connected to a vacuumizing system.

2. The transfer device according to claim 1, wherein the communicating holes disposed in the bottom of each inward concave matching cavity form two circles.

3. The transfer device according to claim 2, wherein a center of the bottom of each inward concave matching cavity is provided with a central hole communicating with the closed air chamber.

4. The transfer device according to claim 1, wherein the guide mechanism includes a plurality of guide posts which are parallel to each other and each guide post has one end fixed to the back surface of the wet blank transfer mold, the moving frame is provided with a plurality of guide sleeve fixing holes and a plurality of guide sleeves fixed to the moving frame within the guide sleeve fixing holes, with respective ones of the guide sleeves sleeved on respective ones of the guide posts one to one so as to be slidably connected.

5. A transfer device for use with a robotic arm for pulp molding, the transfer device comprising:
   a wet blank transfer mold provided with a closed air chamber therein,
      wherein a front surface of the wet blank transfer mold is provided with at least one inward concave matching cavity capable of being sleeved outside a pulp wet blank container and recessed toward a closed air chamber side, the inward concave matching cavity is matched with the pulp wet blank container,
      wherein an inner wall of each inward concave matching cavity and a bottom of each inward concave matching cavity are respectively provided with a plurality of communicating holes connecting the inward concave matching cavity with the closed air chamber, the communicating holes disposed in the inner wall of each inward concave matching cavity are uniformly distributed circumferentially to form at least one circle, and the communicating holes disposed in the bottom of each inward concave matching cavity are uniformly distributed circumferentially to form at least one circle,
      wherein the wet blank transfer mold includes:
         a main mold plate provided with a chamber portion at a back surface, wherein the chamber portion has an opening communicating with the outside, a front surface of the main mold plate is provided with a plurality of the inward concave matching cavities distributed in an array, an inner bottom of the chamber portion is provided with a plurality of inward convex portions corresponding to the inward concave matching cavities one to one, and
         a closing mold plate for closing the opening of the chamber portion, wherein the closed air chamber is formed between the main mold plate and the closing mold plate;
   a moving frame connected in a parallel orientation to a back surface of the wet blank transfer mold via a guide mechanism;

a driver connected between the back surface of the wet blank transfer mold and the moving frame and configured to drive movement of the moving frame to move relative to the wet blank transfer mold; and a plurality of vacuum suction cups disposed on the moving frame at uniform intervals on a side of the moving frame opposite the wet pulp transfer mold, the vacuum suction cups and the closed air chamber configured to be connected to a vacuumizing system.

6. The transfer device according to claim 5, wherein a bottom of the chamber portion is provided with a reinforcing support structure in contact with a surface of the closing mold plate adjacent to the chamber portion.

7. The transfer device according to claim 6, wherein the reinforcing support structure includes a plurality of lateral reinforcing support protrusions I arranged at uniform intervals and a plurality of longitudinal reinforcing support protrusions II arranged at uniform intervals, wherein the reinforcing support protrusions I are located on a straight line through lateral center positions of the chamber portion, the reinforcing support protrusions II are located on another straight line through longitudinal center positions of the chamber portion, and the line of reinforcing support protrusions I and the line of reinforcing support protrusions II form a cross, and wherein one end of each reinforcing support protrusion I away from the bottom of the chamber portion abuts against a surface of the closing mold plate adjacent to the chamber portion, and one end of each reinforcing support protrusion II away from the bottom of the chamber portion abuts against a surface of the closing mold plate adjacent to the chamber portion.

8. The transfer device according to claim 7, wherein one end of each reinforcing support protrusion I abutting against the closing mold plate is provided with a supporting plane I, one end of each reinforcing support protrusion II abutting against the closing mold plate is provided with a supporting plane II, and the supporting plane I and the supporting plane II are located in the same plane.

9. The transfer device according to claim 7, wherein an inner wall of the chamber portion is provided with a plurality of curved concave surfaces connected in sequence, and the outermost inward convex portions of the plurality of inward convex portions correspond to the curved concave surfaces of the plurality of curved concave surfaces one to one.

* * * * *